Aug. 7, 1951  H. J. BUTLER  2,563,392
VEHICLE BRAKE

Filed March 23, 1949  4 Sheets-Sheet 2

Inventor
Henry James Butler
By Benj. T. Rauber
Attorney

Aug. 7, 1951     H. J. BUTLER     2,563,392
VEHICLE BRAKE

Filed March 23, 1949     4 Sheets-Sheet 3

Inventor
Henry James Butler
By Benj. T. Rauber, Attorney

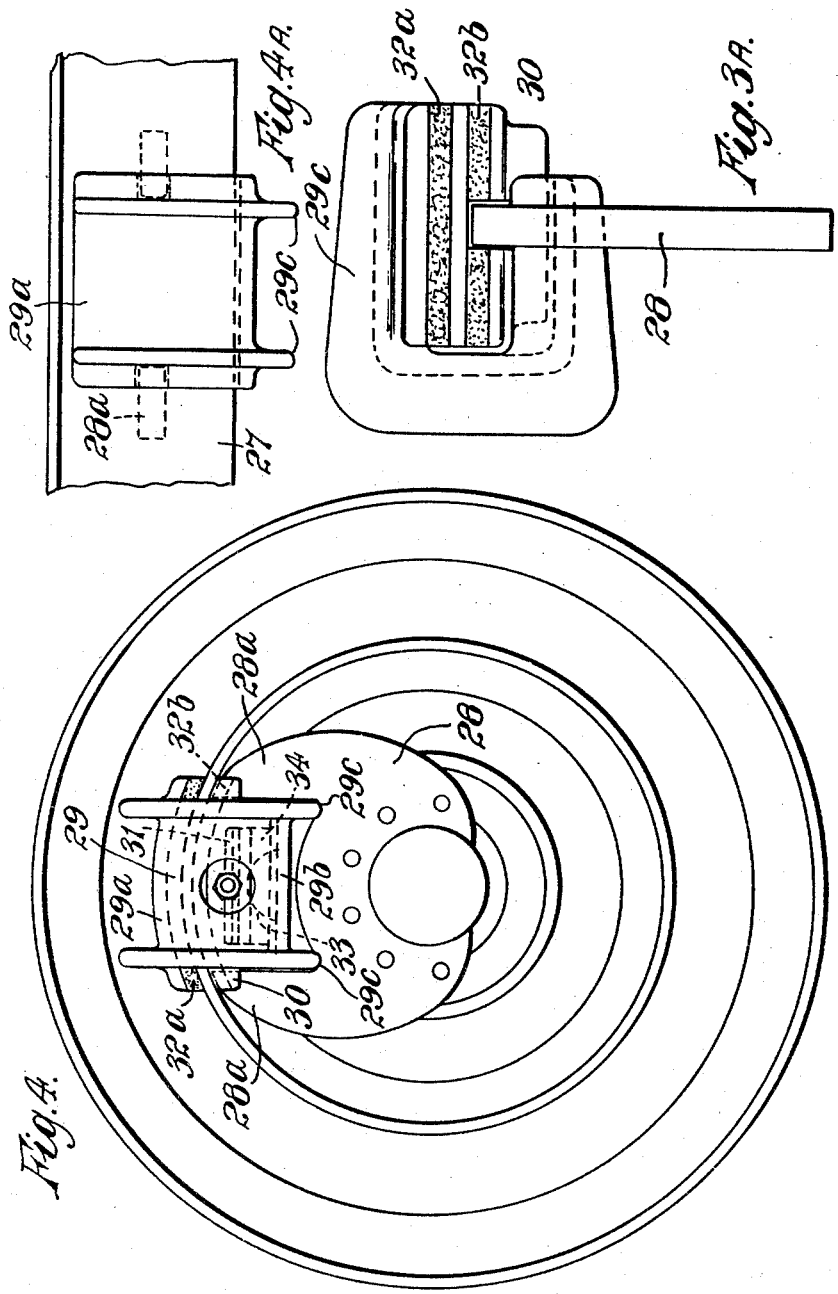

Patented Aug. 7, 1951

2,563,392

UNITED STATES PATENT OFFICE 2,563,392

VEHICLE BRAKE

Henry James Butler, Sutton Coldfield, England, assignor to Dunlop Rubber Company Limited, London, England, a British company Application March 23, 1949, Serial No. 83,051
In Great Britain March 6, 1948

5 Claims. (Cl. 188—152)

This invention relates to brake assemblies of the type having relatively rotatable drum and friction means, and more particularly relates to wheel brakes for light aircraft.

Light aircraft of single seater type, two seater aircraft such as are used for club training and similar types of aircraft which have a low weight and a low landing speed do not need the complex, multi-disc brake constructions that have been developed for larger and faster machines.

Autogiros and the like, which use their brakes mainly for parking and manoeuvring on the ground, also come within this category. Brakes for such aircraft are often of the drum type, and whilst they must be effective enough for all requirements they must also be light, economical to produce, easy to maintain and be sturdy enough to withstand rough usage.

It is the object of this invention to provide a drum brake for light aircraft and the like of enhanced efficiency which is also economical to produce and maintain.

Drum brakes are known comprising a brake drum and two substantially semi-circular friction pads disposed within said drum and adapted to move into frictional engagement with the inner peripheral wall of the drum.

On account of irregularities in the surfaces of either drum or friction pads, in brakes of this type, frictional contact may only be made in localized areas when the brakes are applied, particularly when the drum or pads are slightly worn.

According to the invention a drum brake assembly operable by fluid pressure comprises an annular brake drum, friction pads radially disposed in pairs on the inner and outer surfaces of the said drum and means adapted to force said pads simultaneously into frictional contact with the said drum. Preferably means are provided for allowing the friction pads to rock whereby they are better able to adapt themselves to surface irregularities in said braking surfaces.

In one form of the invention a drum brake assembly comprises two co-axial drums having equal inner and outer diameters and rotatable by a wheel, radially movable and non-rotatable friction pads adjacent the inner and outer surfaces of the drums and extending over only a minor portion of the said surfaces and means for effecting frictional engagement between the drums and the pads. Preferably means are provided to enable the friction pads to rock and adapt themselves to irregularities in the brake drums.

In another form of the invention a drum brake assembly comprises a rotatable brake drum, non-rotatable friction pads adjacent each side of said drum and means associated with a fluid pressure operated mechanism to force the pads against the axially-extending walls of the drum. As in the previous form of the invention, means are provided for allowing the friction pads to rock.

The invention will now be more fully described with reference to the accompanying drawings, in which:

Fig. 3a is a side elevation of a brake station.

Fig. 4 is a side view of the wheel and brake of Fig. 3 and

Fig. 4a is a plan view of a brake station.

Figure 1:
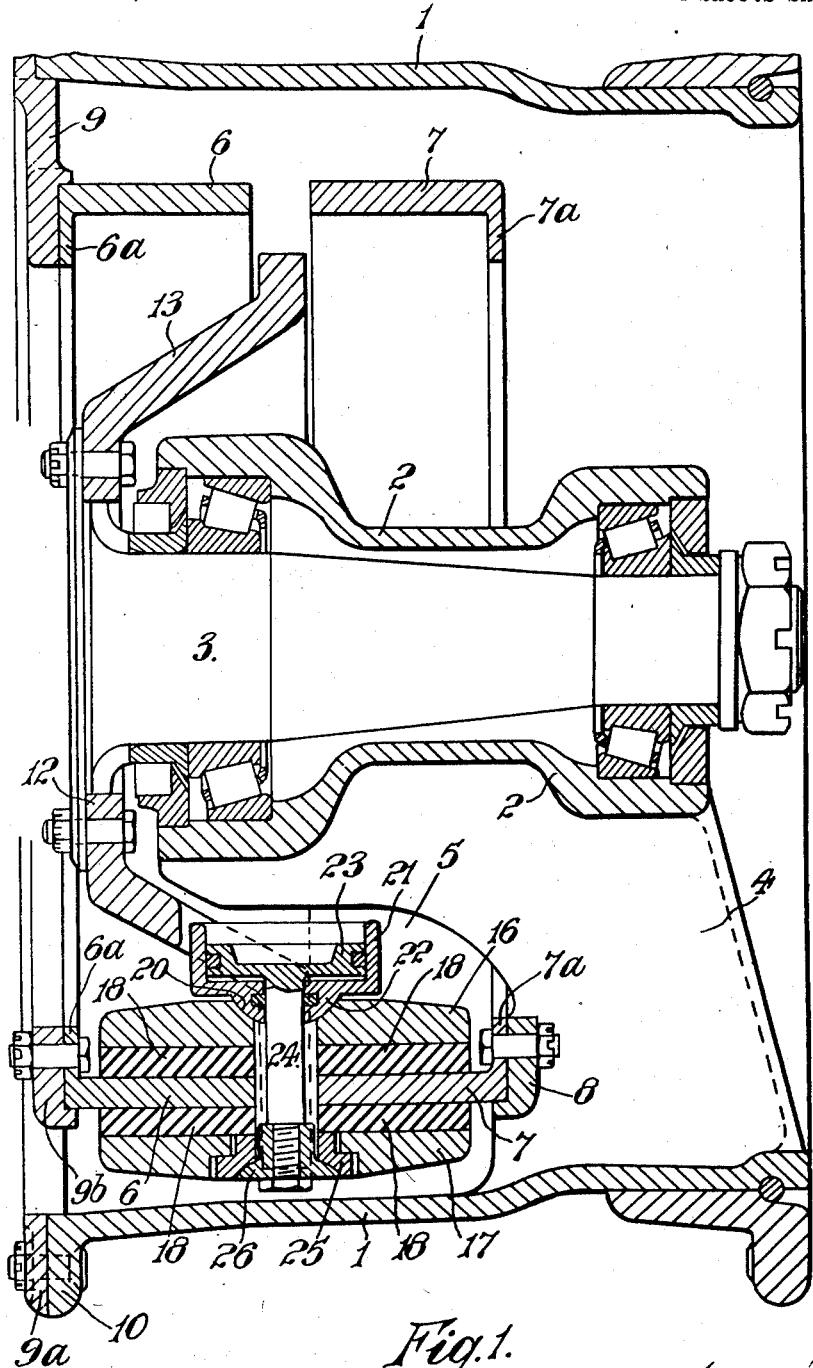
Fig. 1 is a sectional elevation of a wheel and brake assembly in accordance with one embodiment of the invention.

As one embodiment of the invention a drum brake in accordance with the invention will be described incorporated in an aircraft wheel. Said wheel comprises a rim 1, Fig. 1, adapted to seat a tyre, and a hub 2, rotatably mounted on roller bearings on a non-rotating axle 3. The hub and rim are integrally connected by equispaced radial webs 4, a gap 5 being provided at one side of the wheel for the brake assembly.

A brake drum is provided, comprising two annular drum members 6 and 7, each having an inwardly extending annular flange 6a and 7a projecting from one edge. An annular ring 8 is provided integral with the webs 4 at the bottom of the annular gap 5, and the flange 7a of the drum member 7 is secured to this ring by means of bolts. Another annular ring 9 is provided, one end 9a being bolted to a tyre retaining flange 10 integral with the rim 1, and the ring 9 extends radially inwards of the rim. To the other end 9b of said ring is bolted the flange 6a of the drum member 6, the assembly being so arranged that the two drum members 6 and 7 are axially aligned and are co-axial with the wheel. The ends of said members remote from their associated flanges are spaced apart from one another, an annular gap thus being provided.

The annular ring 9 may be slotted between 9a and 9b as this will assist ventilation and subsequent cooling of the brakes.

Figure 2:
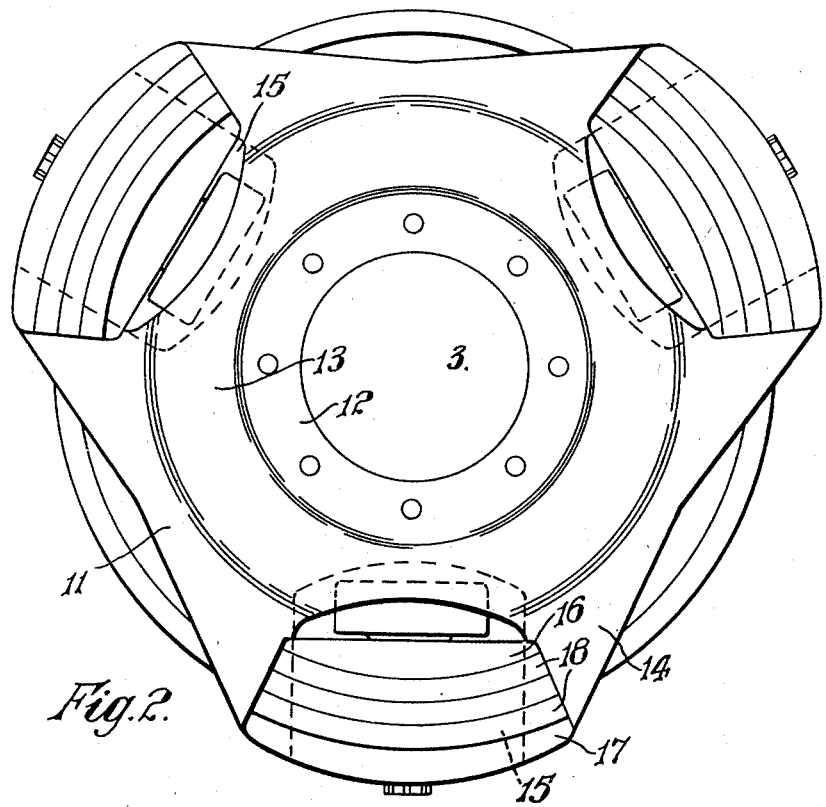
Fig. 2 is a side view of the same drum brake.

A spider 11 is provided, Fig. 2, comprising an annular member 12 having equispaced holes provided therein whereby it may be bolted to a member rigid with the non-rotating axle. From the outer periphery of said member 12 an annular flange 13 extends both outwardly and at an angle to the member 12 and three equispaced radial arms 14 project outwardly from the outer periphery of said flange and normal to the axis of the wheel. Each arm is provided with a slot 15, the sides of the slot being parallel to the radial axis of the slot, and the slot extends into the annular flange to a location intermediate its ends.

Figure 2A:
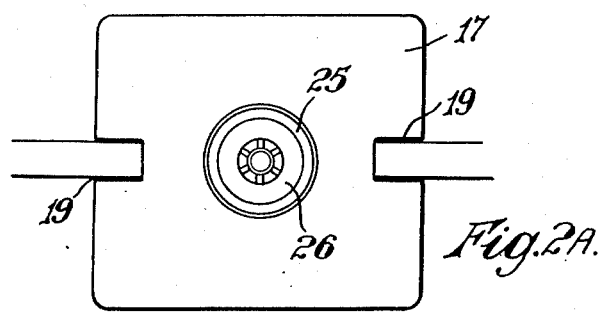
Fig. 2a is a plan view of one of the brake stations.

Three sets of friction pads, pressure plates and fluid pressure operated mechanisms are provided, each associated with one of the radial arms of the spider. Each set comprises an inner pressure plate 16 and an outer pressure plate 17. Each of said plates is provided with a pad of friction material 18 adapted to abut the friction surfaces of the drum members 6 and 7 and shaped to conform to the curvature thereof. The pressure plate and friction pads, which have a rectangular surface area are provided on opposite edges with rectangular slots 19, Fig. 2a, said slots being adapted to loosely engage in the edges of the slot 15 of the arms of the spider, it being understood that the inner pressure plate and associated friction pad are disposed interior of the drum members 6 and 7 and the outer pressure plate and associated friction pad are disposed exterior of said members. The pressure plates and pads have an axial width such that they substantially cover the friction surfaces of drum members 6 and 7.

A hole extends radially through the assembly of friction pads and pressure plates, said hole being aligned with the annular gap between drum members 6 and 7. A concave seating 20 is provided at the end of the hole in the inner pressure plate adjacent the axle, and the cylinder 21 of a piston and cylinder mechanism connected to a source of pressure fluid is provided with a convex portion 22 complementary to said concave seating, whereby the pressure plate is adapted to swivel about said portion. A piston 23 is adapted to operate in the cylinder and has an associated piston rod 24 projecting through a hole in the convex portion 22 and through the assembly of friction pads and pressure plates, the end of the rod being threaded. The outer pressure plate is provided with a stepped hole of two diameters, the larger diameter hole being on that side of the plate adjacent the rim and an annular plug 25 having a stepped outer periphery is loosely fitted in said stepped hole. The outer portion of said plug is provided with a concave seating and a nut 26 having a complementary portion to said seating is secured in threaded engagement with the end of the piston rod.

The brake operates as follows. Pressure fluid is fed between the piston and the face of each cylinder. This forces the cylinder radially outwards and the piston radially inwards of the wheel. Movement of the cylinder forces the friction pad associated with the inner pressure plate into frictional contact with the drum members. Simultaneously movement of the piston and piston rod forces the friction pad associated with the outer pressure plate into frictional contact with the drum members, the pressure on each side of the drum members being substantially equal. Provision is made for compensating for irregularities in the friction surfaces, in that the pressure plates are a loose sliding fit in the slotted arms of the spiders and consequently both axial and circumferential rocking of the pads about the drum members is obtainable, the swivelling connection between the cylinder and the inner pressure plate on the one hand, and the end of the piston rod and the outer pressure plate on the other, allowing this rocking movement to take place.

Figure 3:
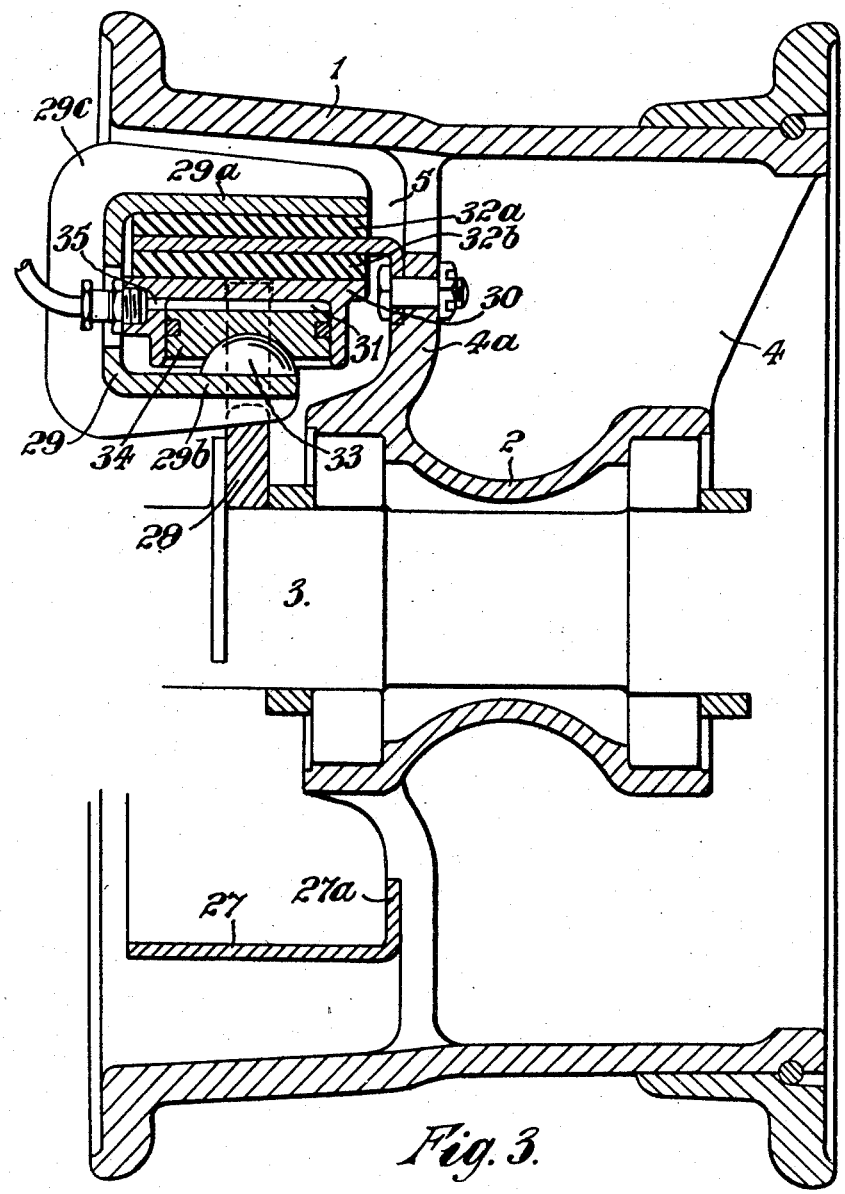
Fig. 3 is a sectional elevation of a wheel and brake assembly in accordance with another embodiment of the invention.

In another embodiment of the invention a drum brake is provided in an aircraft wheel similar to that described in the previous embodiment. A rim 1, Fig. 3, adapted to seat a tyre, is integrally connected to a hub 2 by means of radial webs 4, an annular gap 5 being provided at one side of the wheel for the brake assembly.

A brake drum is provided, comprising an annular member 27 having an annular flange 27a inwardly extending from one edge thereof. Said flange is bolted to an annular ring 4a integral with the radial webs 4 and situated at the end of the annular gap 5, the brake drum thus being secured at a location intermediate the hub and the rim and co-axial with the wheel.

A carrier plate 28, Fig. 4, is bolted to a member solid with the wheel axle, and has two radially projecting arms 28a, the edges of the slot formed by said arms being parallel to the radial axis of the slot, and the arms extend to a location adjacent the inner periphery of the brake drum. The carrier plate is so positioned on the axle that the arms, if radially extended, would bisect the axially aligned wall of the drum.

An outer housing 29, is provided, of substantially U-shaped section. Said housing is located in the slot in the carrier plate with the braking surfaces of the drum disposed between the two arms of the housing. The arm 29a exterior of the drum is curved longitudinally to conform to the curvature of the drum, extending over about one-eighth of its periphery, and is transversely longer than the other arm. Said other arm 29b is straight and is disposed in a plane normal to the radius of the drum. Said two arms are hereinafter termed respectively the curved and straight arms of the outer housing. The housing is also provided with two strengthening ribs 29c, disposed around its outer periphery and spaced adjacent its ends, and the width of the housing at its shorter arm end is such that it will loosely fit into the slot formed between the two arms of the carrier plate.

An inner housing 30 is provided, being of the same length as the outer housing and having one face curved to correspond with the curvature of the brake drum, both ends of said face being provided with a rectangular slot. On the side of the inner housing remote from the curved face a cylinder 31 is provided integral with said housing, the axis of the cylinder being disposed radially of the wheel. Said housing is fitted to the carrier plate with its curved face adjacent the inner braking surface of the drum, and the open end of the cylinder adjacent the straight arm of the outer housing, the slots in the end of the curved face of the inner housing slidably engaging with the two radially extending arms of the carrier plate.

Curved friction pads 32a, 32b are secured to the curved surface of the inner housing and the inner surface of the curved arm of the outer housing, each having an area substantially corresponding with that of its associated surface. A portion of the axially extending wall of the brake drum thus lies between said pads. The straight arm of the outer housing is provided, intermediate its ends, with a part-spherical boss 33, extending radially outwardly towards the brake drum.

A piston 34 is provided, slidably fitted within the cylinder, and the face of the piston remote from the cylinder is provided centrally with a part spherical recess, complementary to the boss, and into which said boss fits. A port 35 is provided in the wall of the cylinder adjacent its end and communicates with a source of fluid pressure under the control of the pilot.

The operation of the brake is as follows: Fluid pressure is introduced between the end face of the cylinder and the inner face of the piston, forcing said two faces mutually away from each other. The cylinder thus moves radially outwards forcing the friction pad associated with said cylinder into frictional contact with the inner braking surface of the brake drum. Simultaneous with this action, the piston is being forced radially inwards of the drum, and, acting through the part spherical boss, forces the whole of the outer housing radially inwards, thus forcing the friction pad associated with the curved arm of said housing into frictional contact with the outer braking surface of the brake drum. The total braking pressure is thus divided substantially equally between the inner and outer friction pads.

It is understood that the outer housing is held in position relative to the carrier plate by the ball and socket connection with the inner housing and the inner housing is held in position by its slidable association with the arms of the carrier plate. Thus the entire assembly is securely located in position and axial movement is largely prevented.

A further feature of the invention lies in the fact that the inner housing and associated piston on one hand, and the outer housing and part spherical boss on the other hand, are mutually pivotable about one another, the boss and complementary recess forming a type of ball joint. Thus surface irregularities of the drum can, within reasonable limits, be compensated for by a rocking movement of the appropriate housing and friction pad. Cooling of the drum is also improved, since the friction pads engage the walls of the drum over only a small portion of its circumference, the remainder of the drum revolving freely in air which accelerates the rate of heat dissipation.

The invention is not limited to the embodiments descrbed. Either of the embodiments, for example, may be provided with one or any convenient number of brake stations, and the brake operating mechanism may, for example, be the double piston and cylinder mechanism more fully described in our Provisional Specification No. 29,190/46 or the double concentric bellows mechanism described in our Provisional Specification No. 23,500/47.

Having described my invention, what I claim is:

1. A drum brake assembly operable by fluid pressure which comprises an annular brake drum, inner and outer friction pads in paired relation adjacent opposite faces of the drum, pressure plates on the sides of said pads remote from the drum, means associated with said plates to move said pads into frictional contact with the drum and a connection between said means and said plates comprising a part-spherical boss located in a complementary seating.

2. A drum brake assembly operable by fluid pressure which comprises two rotatable, co-axial annular brake drums axially spaced apart and having equal inner and outer diameters, a non-rotatable torque plate having a slotted portion radially extending through the gap between the drums, inner and outer friction pads located in each slot adjacent opposite faces of the drums, a pressure plate secured to each pad and radially slidable in said slot and a fluid pressure operated mechanism comprising an operating rod passing through the gap between the drums to move the pads into frictional contact with the drums, said mechanism having a rocking connection with said plates.

3. An assembly according to claim 2 wherein the fluid pressure operated mechanism is a piston and cylinder mechanism, said mechanism comprising a cylinder having a part-spherical boss seating in a complementary cavity in one pressure plate and an operating rod rigid with the piston and having a part-spherical flange seating in a complementary cavity in the other pressure plate.

4. A drum brake assembly operable by fluid pressure which comprises a rotatable brake drum, a non-rotatable slotted torque-plate, a radially movable U-shaped housing located within the slot of the said torque plate, the said housing having an axially disposed arm on each side of the said brake drum, friction pads radially disposed on opposite sides of the said drum within the said housing, and fluid pressure operated mechanism within the said housing whereby the said friction pads are forced simultaneously into frictional contact with the said drum, said mechanism having a rocking connection with said housing.

5. An assembly according to claim 4 wherein said mechanism is a piston and cylinder mechanism and said connection comprises a part-spherical boss on said piston seating in a complementary cavity in one arm of the housing.

HENRY JAMES BUTLER.

REFERENCES CITED

The following references are of record in the file of this patent:

UNITED STATES PATENTS

| Number | Name | Date |
|---|---|---|
| 1,936,569 | Bendix | Nov. 28, 1933 |
| 2,265,578 | Rosenberg | Dec. 9, 1941 |
| 2,268,685 | Walther et al. | Jan. 6, 1942 |